April 16, 1957 M. L. WOOD Re. 24,303

SEMI-CONDUCTOR TRIGGER CIRCUIT

Original Filed July 2, 1951 4 Sheets-Sheet 1

INVENTOR
MARION L. WOOD

BY
Charles E. McTiernan
ATTORNEY

SEMI-CONDUCTOR TRIGGER CIRCUIT

Original Filed July 2, 1951 4 Sheets-Sheet 2

INVENTOR
MARION L. WOOD

BY Charles E. McTernan
ATTORNEY

SEMI-CONDUCTOR TRIGGER CIRCUIT

Original Filed July 2, 1951 4 Sheets-Sheet 3

INVENTOR
MARION L. WOOD

BY Charles E. McTiernan
ATTORNEY

SEMI-CONDUCTOR TRIGGER CIRCUIT

Original Filed July 2, 1951 4 Sheets-Sheet 4

INVENTOR
MARION L. WOOD

BY Charles E. McTiernan
ATTORNEY

United States Patent Office

Re. 24,303
Reissued Apr. 16, 1957

24,303

SEMI-CONDUCTOR TRIGGER CIRCUIT

Marion Loren Wood, Ulster County, N. Y., assignor to International Business Machines Corporation, New York, N. Y., a corporation of New York Original No. 2,651,728, dated September 8, 1953, Serial No. 234,837, July 2, 1951. Application for reissue August 19, 1955, Serial No. 529,602

19 Claims. (Cl. 307—88.5)

Matter enclosed in heavy brackets [ ] appears in the original patent but forms no part of this reissue specification; matter printed in italics indicates the additions made by reissue.

This invention relates in general to a trigger circuit and in particular to a bi-stable trigger circuit arrangement employing a pair of semi-conductive elements.

The principal object of the invention is to provide a trigger circuit including a pair of semi-conducting elements and having two stable states of equilibrium.

Another object of the invention is to provide a bi-stable trigger circuit including a pair of variable impedance elements each of which is characterized by a region of positive variational resistance and a region of negative variational resistance.

A further object of the invention is to provide a bi-stable trigger circuit including a pair of semi-conducting elements in which the triggering action does not depend upon a regenerative or positive feedback circuit connection.

A still further object of the invention is to provide a bi-stable trigger circuit including a pair of semi-conductors each of which is characterized by the current flowing therethrough being a bi-valued function of the voltage.

Other objects of the invention will be pointed out in the following description and claims and illustrated in the accompanying drawings, which disclose, by way of examples, the principle of the invention and the best mode, which has been contemplated, of applying that principle.

A crystal diode includes a minute block of "doped" semi-conductor which is characterized by a region of positive variational resistance and a region of negative variational resistance such as, for example, germanium or silicon. The semi-conductor block is plated with metal on one surface and connected with an extremely fine metallic whisker on the parallel surface. The positive resistance characteristic of the diode may be defined as one in which there is a change in current in the same sense for each change of potential, while in the case of the negative resistance characteristic the current varies inversely with the voltage.

Figure 1:
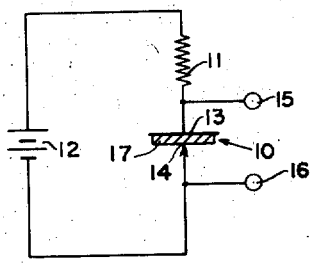
Fig. 1 is a series circuit including a crystal diode, a resistor and a source of potential.
Figure 2:
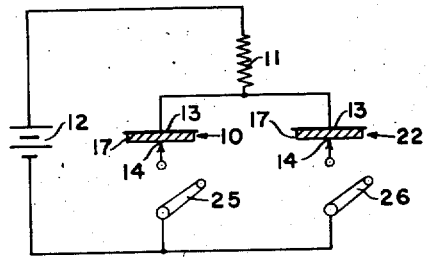
Fig. 2 is a circuit diagram representative of the main embodiment of the invention.
Figure 2C:
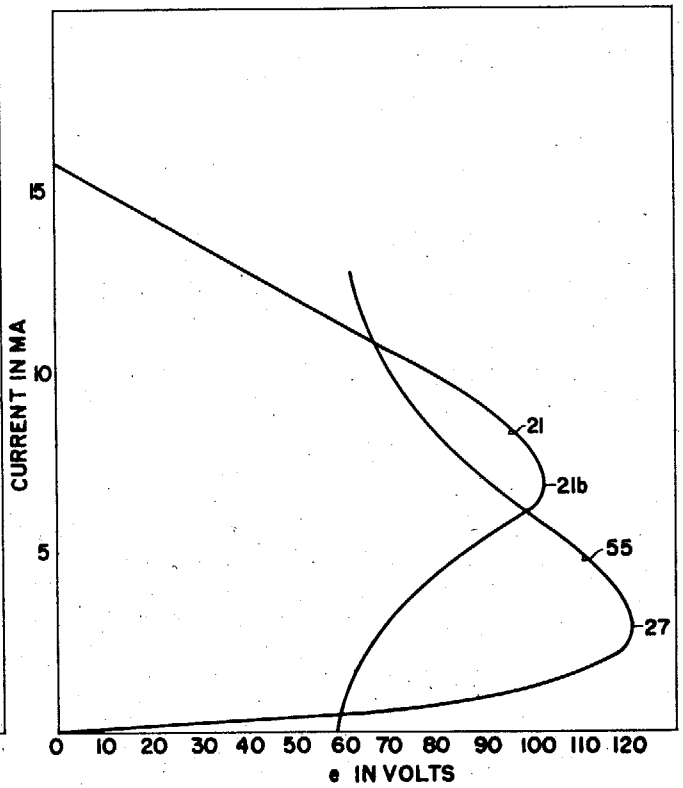
Figs. 2a, 2b, 2c and 2d are a series of characteristic curves representing the operating conditions of the circuit arrangement of Fig. 2.
Figure 2A:
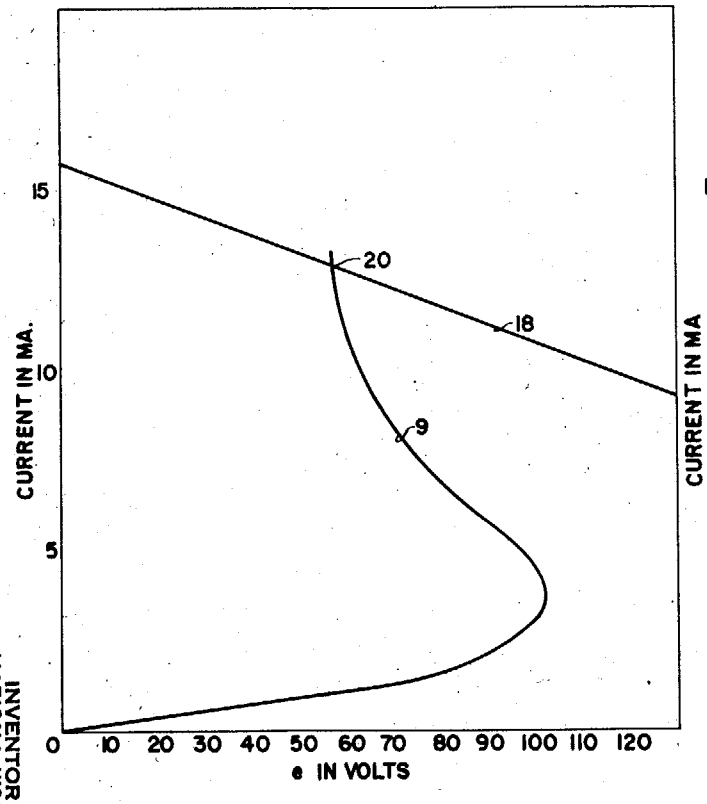

Now referring in detail to Fig. 1, there is shown therein a source of operating potential 12 of the magnitude of approximately 315 volts, a 0.02 megohm resistor 11 and a crystal diode 10, all connected in series. The crystal diode 10 includes a block of semi-conductor material 17 which is plated with a metallic base 13 on one surface and connected with an extremely fine metallic whisker 14 on a parallel surface. The intersection of the load line 15 and the crystal diode characteristic curve 9 at point 20, as shown in the diagram of Fig. 2a, determine the operating point for this series circuit arrangement where the values of the source of potential 12 and the resistor 11 are so selected such that the load line 18 will intersect curve 9 in its region of negative variational resistance.

Figure 2B:
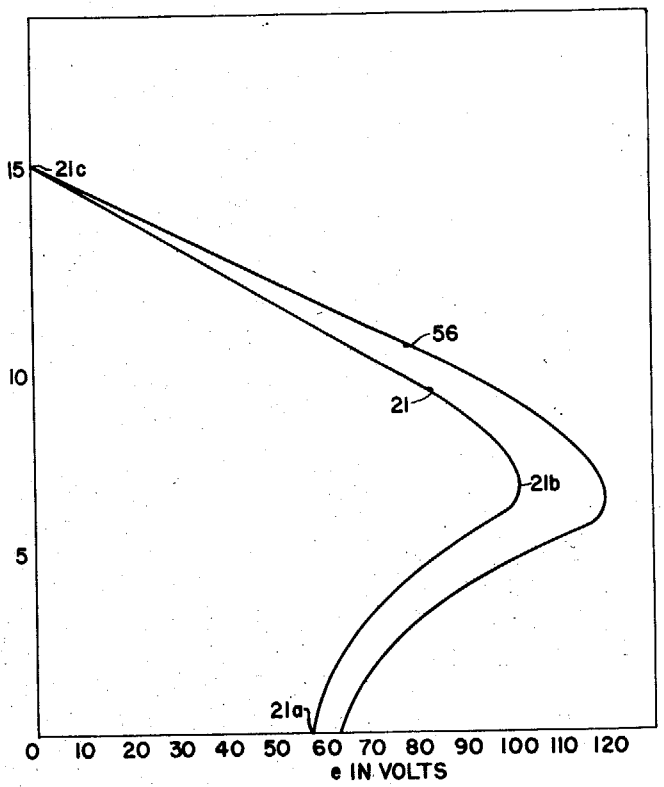

If the input characteristic of this series circuit arrangement is determined across the terminals 15 and 16 (Fig. 1) it will be found to be that as shown by the curve 21 (Fig. 2b). It now becomes apparent that this input characteristic curve 21 serves in reality as a load line for any device that may be connected in parallel with the diode 10. With regard to the input characteristic curve 21, it has been determined experimentally that the diode 10 is in a region of positive variational resistance for the portion **21*b* to 21*c* of the curve 21 and in a region of negative variational resistance for the portion 21*b* to 21*a* of the curve 21. Now if a second crystal diode 22 is connected in parallel with the diode 10, such as shown in Fig. 2, it will be seen that the input characteristic curve 21 intersects the curve 55 representative of the characteristic of the crystal diode 22 at the stable points of operation 23 and 24 (Fig. 2c). The input characteristic curve 56 (Fig. 2b) represents the characteristic obtained when one looks into a series circuit similar to that of Fig. 1 in which the crystal diode 22 is used in place of the diode 10. It is to be noted that if diode 22 were identical to diode 10, curve 56 would be identical to curve 21**; however, for the sake of generality, it is assumed that the diodes are not identical.

Figure 2D:
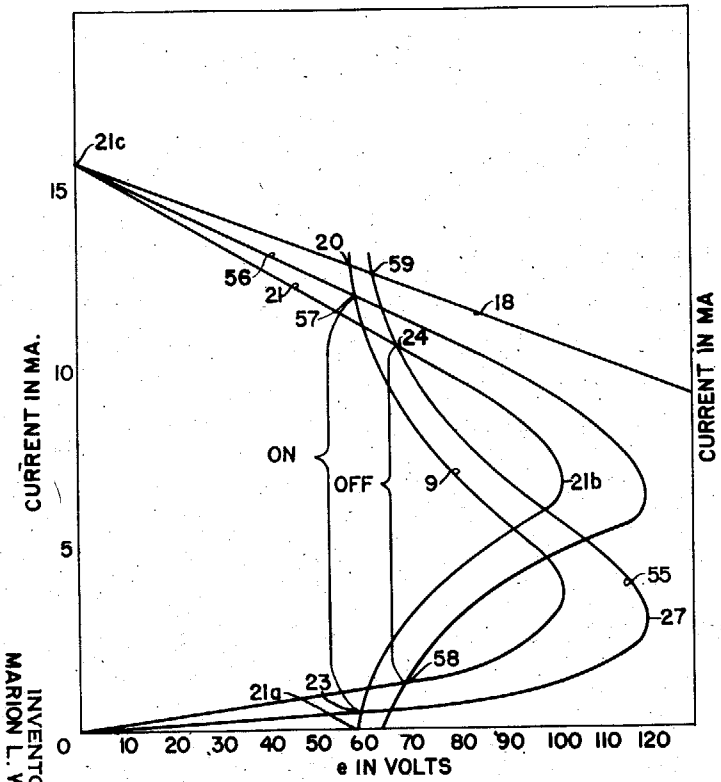

The circuit diagram of Fig. 2 represents the main embodiment of the invention and functions as a trigger circuit in a manner to be presently described. When the trigger circuit is on or in one of the two stable operating positions, the crystal diode 10 operates at point 57 (Fig. 2d) in its region of negative resistance while the crystal diode 22 operates at point 23 in its region of positive variational resistance. In this operating position it is to be noted from Fig. 2d that the diode 10 is at the higher while the diode 22 is at the lesser of two current conditions with the voltage drop across the two diodes being necessarily the same, because they are connected in parallel. In the other stable state of equilibrium, arbitrarily called the "off" state, crystal diode 22 will operate at point 24 in its region of negative variational resistance, while the diode 10 operates at point 58 in its region of positive variational resistance. In this operating position, the current flow through the diode 22 will be at the higher of two values while the current flow through the diode 10 will be at the lower of two values. Also when either of the crystal diodes is operating in its region of negative variational resistance, the current therethrough exceeds that through the other crystal diode which is operating in its region of positive variational resistance.

Assuming that in one state of equilibrium one of the diodes will be in a positive resistance region while the other diode will be in a negative resistance region, the triggering of the circuit arrangement of Fig. 2 may be brought about through the manipulation of the switches 25 and 26. When the switches are operated in a manner to be presently described, the diodes will assume the operating positions of the other state of equilibrium such that the diode in the positive resistance region will shift to the negative resistance region while the diode in the negative resistance region will shift to the positive resistance region. This may be shown by referring to Fig. 2 and assuming that the switch 25 is closed while the switch 26 is open causing diode 10 to operate at point 20 (Figs. 2a and 2d) in its negative resistance region. Now with the switch 25 in a closed position, the closing of switch 26 will connect the diodes 10 and 22 in parallel but since the voltage available to the diode 22 is less than the peak inverse voltage, as represented by point 27, the diode 22 will operate in a positive resistance region at position 23, and diode 10 will shift in its operating point to 57 due to the presence of diode 22 in the circuit. Now if we open the switch 25 and leave the switch 26 closed, the diode 22 will switch from the operating point 23 located in its positive resistance region to the operating point 59 in the negative resistance region inasmuch as the magnitudes of the battery 12 and the resistor [17] *11* have been so selected as to cause the single diode to assume this negative position. Next, if we close the switch 26 with the switch 25 also in a closed position, the diode 10 will assume operating point 58 in the positive resistance region inasmuch as the voltage available to the diode 10 at this time is less than the peak inverse voltage while the diode 22 will remain in the negative resistance region but will shift to position 24.

Figure 3A:
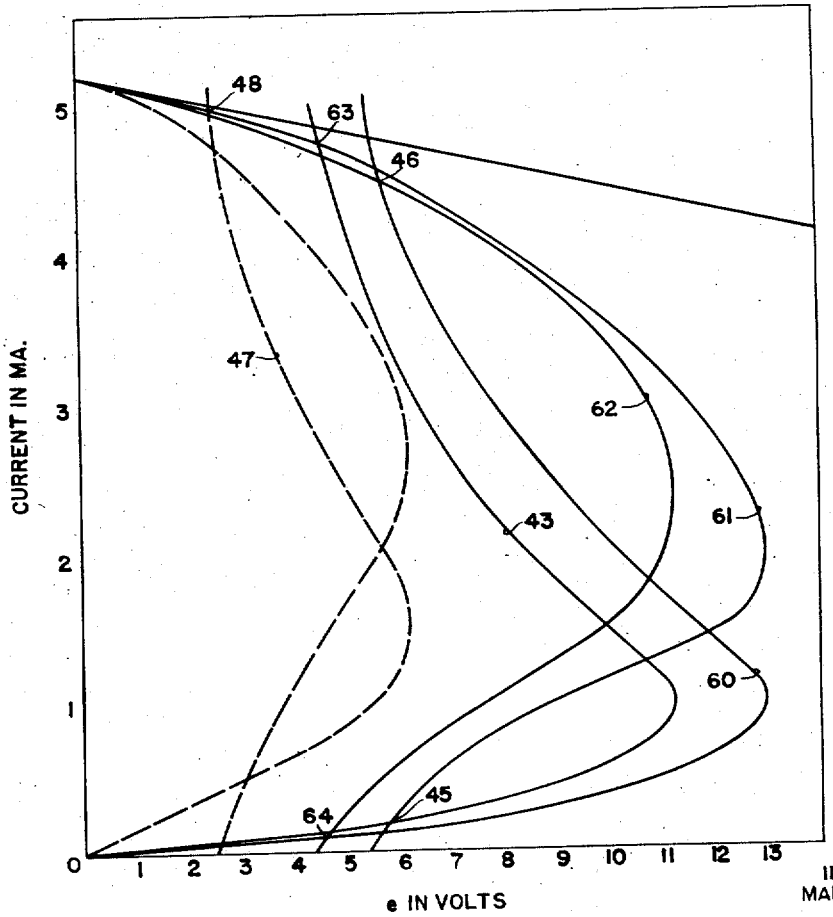
Fig. 3a is a series of characteristic curves representing the operating conditions of Fig. 3.
Figure 3:
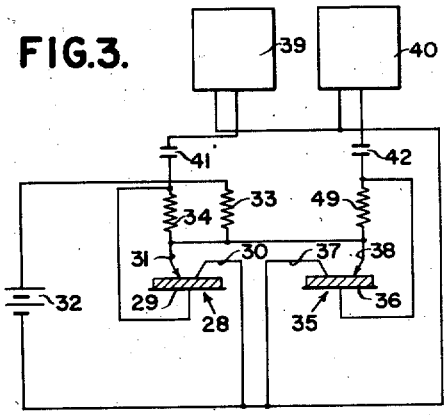
Fig. 3 is a modification of Fig. 2 in which a three electrode semi-conductor element is used in place of a crystal diode.

A modification of Fig. 2 which offers a more practical arrangement for producing a change in the status of the trigger circuit is shown in Fig. 3. In this modification each of the crystal diodes is replaced by a crystal triode or transistor, as it is more commonly known.

The crystal triode or transistor 28 (Fig. 3) includes a block of semi-conductive material which is plated with a metallic base 29 on one surface and connected with a pair of extremely fine metallic electrodes 30 and 31, commonly referred to as the collector and the emitter, respectively. The collector 30 is coupled to the negative side of a 67.5 volt supply source 32 while the emitter is coupled to the positive side of said source through a 13,000 ohm resistor 33. The base electrode 29 is coupled through a 430 ohm resistor 34 to the junction of the emitter electrode 31 and the resistor 33. These various connections of the three electrodes cause the collector 30 to be biased negatively with respect to the remaining two electrodes 29 and 31 while the emitter 31 is biased positively with respect to the base electrode 29. A second transistor or variable impedance element 35 is connected in parallel with the triode 28. The triode 35 has a base electrode 36, a collector electrode 37, and an emitter electrode 38 which are connected in the manner as previously described for the identical electrodes of the triode 28.

The pulse generators 39 and 40 representative of a source of out-of-phase negative pulses are connected through the corresponding capacitors 41 and 42 to the respective base electrodes 29 and 36 of the transistors 28 and 35.

As is well known, and as pointed out in the copending application of A. H. Dickinson, Serial No. 208,966, filed February 1, 1951, a variation in the emitter potential produces a change in the collector characteristic curve 43 (Fig. 3a) which curve is similar in nature to the characteristic curve 9 (Fig. 2a) of the crystal diode. The collector characteristic curve 43 is representative of the characteristic curve obtained for the triode 35 while the curve 60 is the characteristic curve for the triode 28. The input characteristic curves 62 and 61 were obtained in a manner similar to that described with reference to Fig. 1 where curve 61 is the input characteristic with triode 28 in series with source of potential 32 and resistor 33, and curve 62 is the input characteristic when triode 35 is similarly employed.

The method of causing a shift in the status of the trigger circuit of Fig. 3 will now be described with an initial assumption being made that the transistor 35 is operating at point 45 in the positive variational resistance region of the curve 43 and the transistor 28 is operating at point 46 in the negative variational resistance region of the curve 60 (Fig. 3a). It is to be observed from Fig. 3a that at this position of stability the current through the transistor 35 is at the lower of two values while the current through the transistor 28 is at the higher of two values.

Upon applying a negative pulse from the source 40 through the capacitor 42 to the base electrode 36 of the transistor 35, the emitter to base potential thereof will be increased thereby causing a shift in the characteristic curve 43 to the dash line curve 47 as explained in the A. H. Dickinson application Serial No. 208,966. The change in the collector characteristic curve reduces the voltage at which the transistor 35 goes into its region of negative variational resistance and as a result the transistor 35 shifts to the operating point 48. The operating point 48 of the triode 35 will shift to operating point 63 upon the cessation of the negative pulse applied to the base electrode. With the transistor 35 operating in its region of negative resistance, the transistor 28 shifts from point 46 to operating point 64 in the positive resistance region as demanded by the stability criteria of the circuit. Thus a change in status of the trigger circuit of Fig. 3 has occurred in which the transistor 28 is operating at position 64 while the transistor 35 is operating at position 63. In this new stable point of equilibrium the current flow through the transistor 35 is now at the higher of two values while the current flow through the transistor 28 is now at the lower of two values.

In a similar manner, the application of a negative pulse from the source 39 through the capacitor 41 to the triode 28 will switch the trigger back to the status originally assumed.

Figure 4:
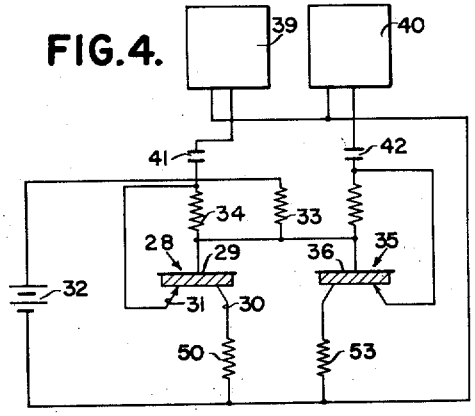
Figs. 4 and 5 are modifications of the circuit arrangement of Fig. 3.

A modification of Fig. 3 is shown in Fig. 4 wherein the functions of the emitter and base, as shown in Fig. 3, are interchanged, and a pair of resistors, 50 and 53, for purposes of deriving an output, are added. In this arrangement of Fig. 4, the collector electrode 30 of the transistor 28 is connected to the negative side of the battery through the resistor 50 while the emitter 31 is coupled to the positive side of the battery 32 through a pair of resistors 34 and 33. The source of positive pulses 39 is coupled through the capacitor 41 to the emitter electrode 28. The transistor 35 which is connected in parallel with the transistor 28 is similarly coupled. In this modification the emitter electrode is made positive with respect to the base electrode thereby enabling the circuit to be made responsive to positive pulses instead of negative pulses.

Figure 5:
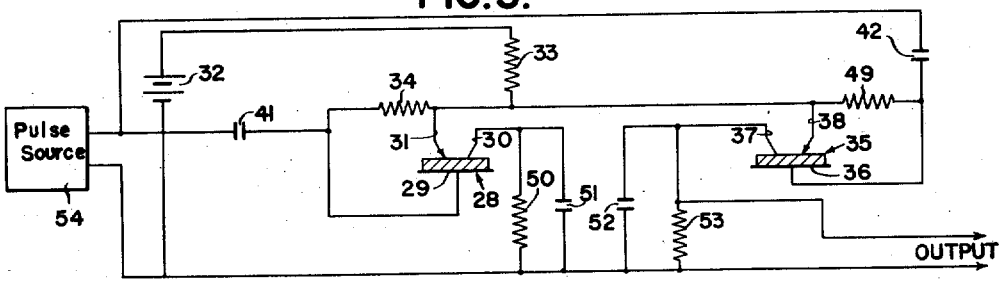

A further modification of Fig. 3 is that shown in Fig. 5. In this modification the collector electrode 30 is coupled to the negative terminal of the battery 32 through a parallel impedance network consisting of the 570 ohm resistor 50 and the .0056 microfarad capacitor 51. In like manner the collector electrode 37 is coupled through the parallel network consisting of the 570 ohm resistor 53 and the .0056 microfarad capacitor 52 to the negative side of the battery 32. A source of negative pulses 54 is jointly coupled through the capacitors 41 and 42 to the respective base electrodes 29 and 36. The insertion of the impedance network in each of the collector circuits in addition to the joint coupling of the pulse source with the base electrodes of each transistor enables the circuit arrangement of Fig. 5 to function as a well known flip-flop circuit in which successive negative pulses applied simultaneously to each of the base electrodes causes the trigger to reverse back and forth in status.

For example, let it be assumed that the transistor 35 is operating at point 63 (Fig. 3a) in the region of negative resistance while the transistor 28 is operating at point 64 in the region of positive resistance when a negative pulse is simultaneously applied to the base electrodes of the triodes 28 and 35. The negative pulse applied to the transistor 35 will be ineffective in causing a shift in status but it will be effective, as previously discussed, in causing the transistor 28 to shift to the negative resistance region which, in turn, will cause the transistor 35 to shift to the positive resistance region thereby resulting in the trigger circuit assuming the other state of equilibrium. The next following negative pulse will cause the trigger circuit to shift back to its original state of equilibrium.

Figure 6:
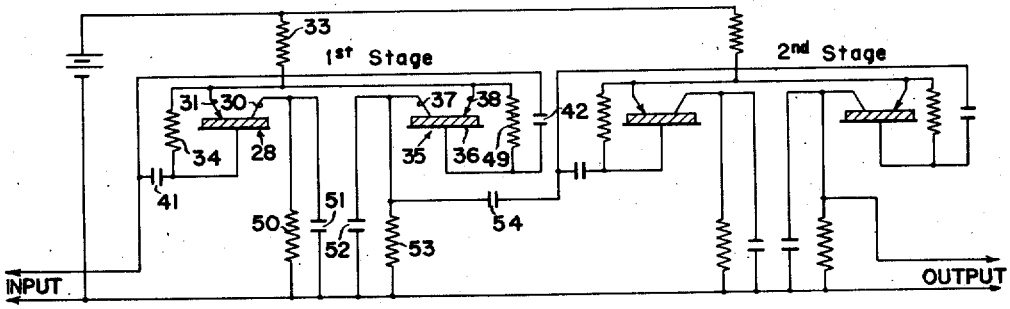
Fig. 6 is a binary counter arrangement incorporating the present invention.

In Fig. 6, a two stage pulse counter is formed by capacitively coupling the trigger circuit of Fig. 5 with a similar trigger circuit. While only two stages are shown it is pointed out that it is within the scope of the invention to connect two or more trigger circuits as a decade counter in a manner which is well known in the art. The output taken across the resistors 53 of the first stage is applied jointly through the 0.05 microfarad capacitor 54 to each of the base electrodes of the second stage such that a change in status of the second stage occurs for only every second negative pulse applied to the input side of the first stage.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A bi-stable trigger circuit comprising a plurality of variable impedance elements, each having a current/voltage relationship such that the current is a multi-value function of the voltage, a source of current and means for initiating a change in the distribution of the *current flow from said* source [of current] between said elements, the current through one of said elements in one state of equilibrium exceeding the current through the other of said elements, while the current through said other of said elements in the other state of equilibrium exceeds the current through said one of said elements.

2. A trigger circuit having two stable operating conditions comprising a pair of parallel connected variable impedance elements, each including a semi-conductor element having different [resistance] *impedance* characteristics in each of said conditions, a source of current, the current flow through one of said elements being greater than that through the other of said elements in one of said conditions, and vice versa, in the other of said conditions, and means for initiating a change in the distribution of the *current flow from said* source [of current] between said elements.

3. In a trigger circuit having two stable states of equilibrium, a pair of [crystal] *semi-conductor* diodes, a source of potential, impedance means, means for sequentially coupling first one of said diodes in series with said source and impedance means, then said diodes in parallel with said source and impedance means, and then the other of said diodes in series with said source and said impedance such that the status of said trigger shifts from one state of equilibrium to another.

4. A bi-stable trigger circuit comprising a pair of variable impedance elements each having a characteristic including a region of positive and negative variational resistance, a source of potential and a resistor serially arranged, and means for sequentially coupling first one of said elements and then the other of said elements in series with said resistor, said circuit shifting from one status to the other as said elements are serially coupled by said sequential means.

5. A trigger circuit having two stable points of equilibrium comprising [a] first and second semi-conductor *devices,* each having a plurality of electrodes, means for applying operating potentials to said electrodes[,] *including* means for coupling said first and second semi-conductor devices in parallel, and means for alternately applying [negative] *input* pulses to one of said electrodes of said first and second semi-conductor *devices* for causing a shift in status of said trigger circuit.

6. A bi-stable trigger circuit comprising [a] first and second [crystal triode] *transistors,* each having a collector, *an* emitter and a base electrode coupled to a semi-conductive element, means for coupling [said first and second triode in parallel] *at least two of the electrodes of one transistor to corresponding electrodes of the other transistor by respective direct connections,* means including a common impedance element for applying operating potentials to said first and second [triode] *transistors, there being no cross-connection between the electrodes of said transistors,* and pulse means coupled to each said base electrode for sequentially causing a shift in status of said circuit.

7. A trigger circuit having two stable states of equilibrium comprising a pair of semi-conducting elements, each having a characteristic including a region of positive and negative variational resistance, each of said elements having a base electrode, an emitter electrode, and a collector electrode, means for connecting said elements in parallel[, means] *and for applying operating potentials thereto* including a common impedance element [for applying operating potentials to said elements], one of said elements being in the region of negative resistance while the other of said elements is in the region of positive resistance when said circuit is in one of said states of equilibrium, and means for applying a negative pulse to the base electrode of said other *of* said elements to cause said circuit to shift to the other of said states of equilibrium.

8. A trigger circuit having two stable states of equilibrium comprising a first [crystal triode] *transistor* including a first collector electrode, a first emitter electrode, a first base electrode and a first semi-conducting element, [means for disposing] said electrodes [in operating relationship with] *operatively contacting* said element, a source of operating potential having positive and negative terminals, a first impedance network including a resistor and capacitor in parallel, means for coupling said collector *electrode* to said negative terminal through said network, a first resistor means for coupling said base electrode to said emitter *electrode,* a second [crystal triode] *transistor* having a second collector electrode, a second emitter electrode, a second base electrode, and a second semi-conducting element, said second electrodes operatively contacting said second element, a second impedance network including a resistor and capacitor in parallel, means for coupling said second collector *electrode* to said negative terminal through said second network, a second resistor means for coupling said second base electrode to said second emitter *electrode,* impedance means commonly coupling said first and second emitter electrodes to said positive terminal, and a source of negative pulses commonly coupled to said first and second base electrodes.

9. An impulse counter circuit arrangement comprising a first stage including a first trigger circuit and a second stage including a second trigger circuit, said first and second circuits each comprising a pair of semi-conducting elements, each including a base electrode, an emitter electrode, a collector electrode, and a semi-conductor *body,* said electrodes operatively contacting the corresponding semi-conductor *body,* a source of potential, means for positively biasing each said emitter *electrode* with respect to the corresponding base electrode, means for negatively biasing each said collector electrode with respect to the corresponding base electrode, resistor means for commonly coupling each said emitter electrode of said first and second circuits to the positive terminal of said source of potential, means for applying the output signal of said first stage to said second stage, and means for applying negative pulses to said first stage.

10. A trigger circuit having two stable states of equilibrium comprising [a] first and second [crystal triode] *transistors,* each including [a] collector, emitter, and base electrode*s*, and a semi-conducting element, each said electrode *being* operably coupled to the associated one of said element*s*, a source of operating potential having positive and negative terminals, means for coupling each said collector *electrode* to *one of* said [negative] terminal*s*, means including a resistive element for coupling each said emitter *electrode* to the corresponding base electrode, means commonly coupling each said base electrode to *the other of* said [positive] terminal*s*, and means including a source of pulses of predetermined polarity commonly coupled to said base electrodes.

11. A pulse counter circuit arrangement comprising [a] first and second trigger circuit*s*, each said circuit comprising a pair of semi-conducting devices, each including a base electrode, an emitter electrode, a collector electrode, and a semi-conductor *body,* each said electrode operatively contacting the corresponding one of said semi-conductor *bodies,* means for [positively] biasing each said emitter *electrode in one polarity* with respect to the corresponding base electrode, means for [negatively] biasing each said collector electrode *in the opposite polarity* with respect to the corresponding base electrode, means for applying the output signal of said first trigger *circuit* to said second trigger circuit, and means for applying pulses of a predetermined polarity to said first *trigger* circuit.

*12. A bi-stable trigger circuit comprising first and second transistors, each having a collector, an emitter, and a base electrode coupled to a semi-conductive element, means for coupling at least two of the electrodes of one transistor to corresponding electrodes of the other transistor by respective direct connections, means including a common impedance element for applying operating potential to the transistors, there being no cross-connection between the electrodes of said transistors, and pulse means coupled to each said emitter electrode for sequentially causing a shift in status of said circuit.*

*13. A circuit comprising first and second transistors, each having a control electrode and an output electrode, means for coupling at least two of the electrodes of one transistor to corresponding electrodes of the other transistor by respective direct connections, means including a common impedance element connected to said output electrodes for applying operating potentials to the transistors, there being no cross-connection between the electrodes of said transistors, and pulse means coupled to each said control electrode for controlling the current flow through said common impedance element.*

*14. In combination, a plurality of transistors having a like electrode of each tied together and to a common load impedance, means for operatively biasing said transistors through said common load impedance, and pulse means coupled to each transistor to control the current flow through said common impedance.*

*15. In combination, a plurality of transistors having a like electrode of each tied together and to a common load impedance, means for operatively biasing said transistors through said common load impedance, and a plurality of independent signal means, each individually coupled to a respective transistor to control the current flow through said common impedance.*

*16. A bi-stable circuit comprising a pair of transistors, each having an emitter electrode, a base electrode, and a collector electrode, means for operatively biasing said electrodes including a source of potential and a resistor serially arranged and means connecting both said emitter electrodes together and through said resistor to said source, said resistor being effective to limit the total current from said source to a value sufficient to maintain one only of said transistors substantially conductive, and means operable when either transistor is substantially conductive to reduce the impedance of the other transistor, thereby reversing the conducting states of said transistors.*

*17. A bi-stable circuit comprising a pair of transistors, each having an emitter electrode, a base electrode, and a collector electrode, means for operatively biasing said electrodes including a source of potential and a resistor serially arranged and means connecting both said base electrodes together and through said resistor to said source, said resistor being effective to limit the total current from said source to a value sufficient to maintain one only of said transistors substantially conductive, and means operable when either transistor is substantially conductive to reduce the impedance of the other transistor, thereby reversing the conducting states of said transistors.*

*18. A bi-stable circuit comprising two semi-conductor diodes, each having two electrodes, a source of potential and a resistor serially arranged, means connecting a respective electrode of each of said diodes through said resistor to said source, said resistor being effective to limit the total current from said source to a value sufficient to maintain only one of said diodes substantially conductive, and means operable when either diode is substantially conductive to reduce the impedance of the other diode, thereby reversing the conducting states of said diodes.*

*19. A bi-stable circuit comprising two semi-conductive devices, each having at least two electrodes, means for operatively biasing said electrodes including a source of potential and a resistor serially arranged, and means connecting a respective electrode of each of said devices together and through said resistor to said source, said resistor being effective to limit the total current from said source to a value sufficient to maintain only one of said devices substantially conductive, and means operable when either device is substantially conductive to reduce the impedance of the other device, thereby reversing the conducting states of said devices.*

References Cited in the file of this patent or the original patent

UNITED STATES PATENTS

| | | |
|---|---|---|
| 2,448,336 | Weiner | Aug. 12, 1948 |
| 2,524,134 | Palmer | Oct. 31, 1950 |
| 2,533,219 | Burnight et al. | Dec. 12, 1950 |
| 2,535,303 | Lewis | Dec. 26, 1950 |
| 2,567,214 | Kohler | Sept. 11, 1951 |
| 2,576,026 | Meacham | Nov. 20, 1951 |
| 2,594,449 | Kircher | Apr. 29, 1952 |
| 2,614,140 | Kreer | Oct. 14, 1952 |
| 2,633,535 | Daskam | Mar. 31, 1953 |